United States Patent [19]

Lippert et al.

[11] Patent Number: 4,839,676
[45] Date of Patent: Jun. 13, 1989

[54] FILM CASSETTE-LIQUID SPREAD ROLLER ASSEMBLY INTERFACE

[75] Inventors: Irving S. Lippert, Lexington; John I. Sturgis, Stoneham; George D. Whiteside, Lexington, all of Mass.

[73] Assignee: Polaroid Corporation, Cambridge, Mass.

[21] Appl. No.: 188,970

[22] Filed: May 2, 1988

[51] Int. Cl.⁴ .............................................. G03B 17/52
[52] U.S. Cl. ........................................ 354/86; 354/21; 354/304
[58] Field of Search ..................... 354/85, 86, 87, 304, 354/21

[56] References Cited

U.S. PATENT DOCUMENTS

| | | |
|---|---|---|
| 3,421,468 | 3/1966 | Wolf . |
| 3,460,452 | 8/1969 | Land . |
| 3,777,647 | 12/1973 | Land . |
| 3,779,770 | 12/1973 | Alston et al. . |
| 3,810,211 | 5/1974 | Wareham et al. ..................... 354/86 |
| 3,832,731 | 8/1974 | Kinsman ............................. 354/304 |
| 4,104,669 | 8/1978 | Friedman ............................ 354/304 |
| 4,226,519 | 10/1980 | Gervais et al. ....................... 354/174 |
| 4,545,663 | 8/1985 | Douglas ............................. 354/304 |
| 4,664,497 | 5/1987 | Johnson et al. ...................... 354/86 |
| 4,693,963 | 9/1976 | McCole .............................. 430/499 |

Primary Examiner—A. A. Mathews
Attorney, Agent, or Firm—Alfred E. Corrigan

[57] ABSTRACT

Photographic apparatus for supporting a cassette containing a plurality of film units of the self-developing type in position for exposure. Subsequent to its exposure, the film unit is moved out of the cassette and redirected to a liquid spread roller assembly located below the cassette. The roller assembly includes
(1) a pair of rollers for rupturing a container of processing liquid associated with a leading end of the film and spreading its contents between layers of the film unit to initiate the formation of a visible image, and
(2) structure which cooperates with the external configuration of the cassette for controlling the thickness and/or shape of the processing liquid being spread.

24 Claims, 5 Drawing Sheets

FILM CASSETTE-LIQUID SPREAD ROLLER ASSEMBLY INTERFACE

BACKGROUND OF THE INVENTION

1. Field of the Invention

The invention relates to photographic apparatus including an instant of self-developing type camera and a film assemblage which interrelate with each other to control the thickness and/or shape of a layer of processing liquid to be spread between layers of an exposed film unit.

2. Description of the Prior Art

The invention is directed to certain improvements in the relationship between photographic film assemblages of the self-developing type and the cameras (or camera backs) with which they are adapted to be used. More specifically, the invention relates to a relationship between the two which allows for a greater spacial juxta-positioning between processing liquid spread control features on a film cassette and the liquid spreading and control structures in a camera.

As pointed up in U.S. Pat. No. 3,799,770, an important step in the processing of an exposed instant or self-developing type film unit is the spreading of a processing liquid between predetermined layers of the film unit to initiate the formation of a visible image therein via a diffusion transfer process. In order to obtain an optimum quality positive print, it is desirable that the processing liquid be spread such that it covers the entire photoexposed area of the film unit in a thin layer of predetermined uniform thickness.

A typical film unit includes a photosensitive element, an image-receiving element which may be superposed on the photosensitive element subsequent to exposure or may be transparent and predisposed on the photosensitive element such that exposure may be made through the image-receiving element, and a rupturable pod or container of processing liquid located at one end of the two elements.

In a typical self-developing photographic system, the film units are arranged in stacked relation within a film cassette which is adapted to be inserted into the receiving chamber of an appropriate camera to locate an endmost film unit in the stack in position for exposure.

Subsequent to exposure, the endmost film unit is extracted from the film cassette and is advanced, pod end first, between a pair of pressure-applying members mounted within the camera. The pressure-applying members exert a compressive force on the pod causing it to rupture and discharge the liquid between predetermined layers of the film unit, e.g., between the exposed photosensitive element and the superposed image-receiving element. Continued advancement of the film unit between the pressure-applying members results in the liquid being advanced along a liquid wave front toward the trailing end of the film unit such that it is progressively distributed over the photoexposed area of the film unit.

The uniformity of the liquid layer is, to a large degree, determined by the initial shape of the liquid wave front. In order to uniformly spread the processing composition over a substantially rectangular or square photoexposed area it is preferable that the wave front be disposed in a substantially straight line which extends outwardly to the lateral margins of the area and is oriented in a direction that is normal to the direction of film advancement between the pressure-applying members.

There are several factors which effect the initial shape of the wave front. One is a design of the pod and its rupture characteristics. Another relates to the viscosity and amount of liquid enclosed by the pod. The wave front shape is also influenced by the velocity at which the film unit is advanced through the pressure-applying members, the amount of compressive pressure exerted on the film unit, and the resistance to liquid flow at the interfaces between the liquid and the superposed film unit elements.

One of the most commonly observed spread shapes is a tongue shape wherein the wave front progresses more rapidly at the central portion of the photoexposed or image-forming area than out at the lateral margins. This condition may be caused by an uneven distribution of liquid upon initial discharge from the pod, i.e., more liquid being concentrated at the center of the film unit than out at its edges. In the subsequent spreading of the tongue-shaped wave front, it is possible that the corners of the image-forming area at the trailing end of the film unit will be coated with a layer of liquid of reduced depth or thickness, thus, possibly adversely affecting the film unit's sensitometry or not be coated at all.

In an instant type film unit of the "integral type", as shown in U.S. Pat. No. 4,693,963, the film unit is configured as including first and second superposed sheets, at least one of which comprises photosensitive constituents, whose lateral edges are permanently secured to each other by longitudinally extending rails. Because these sheets are bound at their lateral edges, the sheets tend to separate more in the center of the film unit than out at the lateral margins in response to the processing liquid being spread therebetween. Thus, there is more resistance to the flow of the processing liquid at the edges of the film unit vis-a-vis its center section. Upon initial discharge of the liquid from its pod, it assumes a rearwardly extending tongue shape rather than proceeding toward the trailing end of the film unit along a uniform wave front.

One method employed to compensate for a tongue-shaped wave front has been to provide excess liquid in the pod. Another method has been to equip the camera with spread control devices which serve to modify the shape of the liquid wave front during spreading.

The spread control devices are designed to apply a second compressive force to the central portion of the film unit in the path of the mass of liquid discharged from the pod by the pressure-applying members. This serves to retard the central portion of the wave front and cause a flow of liquid in a direction transverse to the direction of film advancement. In this manner, the wave front is modified such that it is substantially straight and is oriented in a direction substantially normal to the parallel sides of the rectangular or square image-forming area.

For examples of cameras which include processing liquid spread control means reference should be had to U.S. Pat. Nos. 3,241,468, 3,777,647 and 3,810,211. For examples of film assemblages which include film cassettes having processing liquid spread control features reference should be had to U.S. Pat. Nos. 3,779,770, 3,832,731, 4,104,669 and 4,226,519.

A major drawback with systems of the type shown and described in the patents listed above is that the control features located on the film cassette are formed on interior surfaces thereof and thus must be spaced relatively close to the pressure-applying means or spread rollers of the camera in order to be effective. This severely restricts the options available to a camera designer in the placement of the spread rollers relative to the film cassette. Further, if spreading of the processing liquid takes place substantially at the location where the film unit emerges from its cassette, then it is generally advisable that the film unit be maintained in a planar condition until processing of the image has been substantially completed. This is so as not to subject that layer of processing liquid to any external forces, such as may be caused by bending the film unit during its transport to a storage chamber or to the exterior of the camera.

SUMMARY OF THE INVENTION

The present invention relates to an instant or self-developing type camera and to a film assemblage specifically adapted for use therewith. The camera includes a film chamber having an apertured plate for properly locating the film assemblage in a focal plane of the camera. The film assemblage includes a film cassette having a generally parallelepiped configuration. Preferably, the film cassette is molded from any suitable material which is compatible with film units to be located therein. A forward wall of the film cassette includes a generally rectangularly shaped aperture therein through which an endmost film unit in a stack of film units located within the cassette may be photographically exposed. A bottom wall of the cassette has a processing liquid spread control means molded in an exterior surface thereof. A leading end wall of the cassette is formed with a laterally extending slot or egress which is dimensioned to permit the movement of a film unit therethrough; and a trailing end wall is configured with a slot for receiving a film unit advancing member of the camera which is adapted to engage a trailing end of the endmost film unit, subsequent to its exposure, prior to moving it to the exterior of the cassette via the egress.

The camera further includes a pair of shafts, at least one of which is motor driven, each of which includes on its opposite ends a section of increased diameter which define opposite pairs of superposed edge rollers. These rollers are adapted to engage opposite margins of the endmost film unit so as to continue its movement in a first direction into an arcuate passageway which functions to redirect the endmost film unit in a second direction into the bite of another set of laterally spaced pairs of edge rollers. The latter edge rollers continue the movement of the exposed endmost film unit between a pressure plate and the processing liquid spread control means on the film cassette and then into the bite of a pair of elongate rollers. The elongate rollers are adapted to be driven in a direction so as to rupture a container of processing liquid attached to a leading end of the endmost film unit and spread its contents between layers of the film unit to initiate the formation of a visible image therein while simultaneously advancing the film unit into a lighttight storage chamber. The film unit is adapted to stay in the storage chamber until its emerging is no longer susceptible to being adversely affected by being moved into the ambient light. Alternatively, the film unit may contain its own opacification system for preventing such exposure, in which case the storage chamber need not be lighttight or may be omitted and the film advanced directly to the exterior of the camera.

As the container of processing liquid is ruptured by the spread rollers, the emerging processing liquid forms a wave which travels in a direction toward the pressure plate as well as from the leading end of the film unit to its trailing end. The pressure plate is biased against one major surface of the endmost film unit so as to move an opposite major surface of the film unit into engagement with the processing liquid spread control means formed in the external surface of the film cassette's bottom wall. The constraint applied to opposite sides of the advancing film unit by the pressure plate and the processing liquid spread control means, at a point immediately in front of the advancing wave of processing liquid, acts to retard the wave's progress at intermediate portions of the wave, thus providing a wave front which is relatively linear and perpendicular to the direction of movement of the film unit through the spread rollers.

A side wall of the film cassette is formed with a tab or protrusion which is adapted to engage a portion of a movably mounted structure for supporting the spread rollers, which structure locates the spread rollers in the path of movement that a film unit would take during its movement from the film cassette to the storage chamber. The precise location of the tab relative to the film cassette's bottom or top wall, or its thickness, is chosen so as to insure that the gap or bite between the superposed spread rollers occupies a predetermined relation to the path of movement of the film unit at a location immediately prior to the latter's leading edge engaging one of the spread rollers. Thus, by judiciously selecting the location of the tab on the cassette's side wall, the aforementioned relationship between the gap and the path of travel can be altered thus effectively increasing or decreasing the angle at which the film unit enters the gap thereby changing the thickness of the layer of processing liquid to be spread by the rollers. For example, it the path of travel of the film unit into the bite between the spread rollers in generally perpendicular to a plane containing the axes of the spread rollers, then any deviation from such path will result in a thinner thickness of processing liquid being spread between elements or layers of the film unit. Conversely, if the angle of entry of the film unit is not perpendicular to said plane, than any relative movement between the two towards a perpendicular relationship will result in a thicker spread.

An object of the invention is to provide a camera of the instant type with means for urging an exposed film unit into engagement with a processing liquid spread control means located on an exterior surface of a film cassette as a processing liquid is being spread between layers of the film unit.

Another object of the invention is to provide a film cassette with means for locating a pair of camera mounted spread rollers having a gap therebetween relative to a path of travel to be taken by an exposed film unit of the instant type as it is moved into the gap thereby affecting the thickness of a layer of processing liquid to be spread between elements of the exposed film unit.

Still another object of the invention is to provide a photographic film assemblage with a film cassette having means in an external surface thereof for cooperating with structure in a camera for controlling the distribution of a quantity of processing liquid between layers of an exposed film unit of the instant type.

Other objects of the invention will in part be obvious and will in part appear hereinafter.

The invention accordingly comprises the structure possessing the construction, combination of elements and arrangements of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
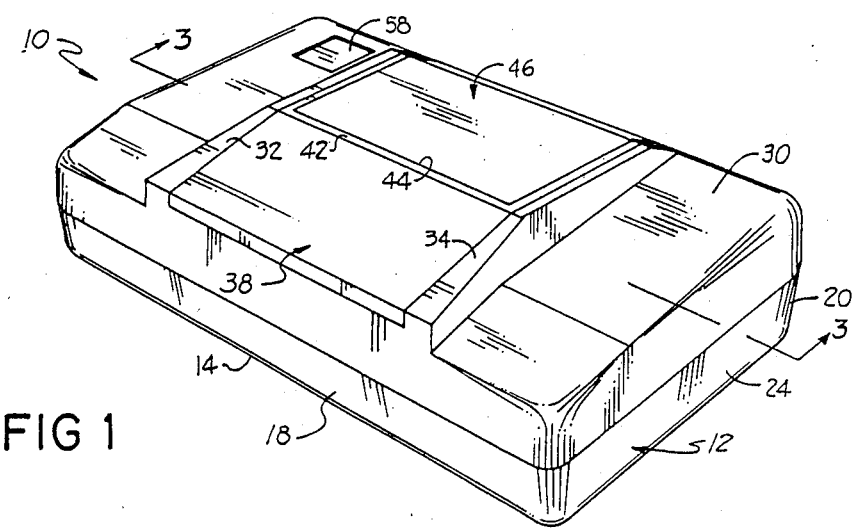
FIG. 1 is a perspective view of an instant type folding camera which embodies the present invention.
Figure 2:
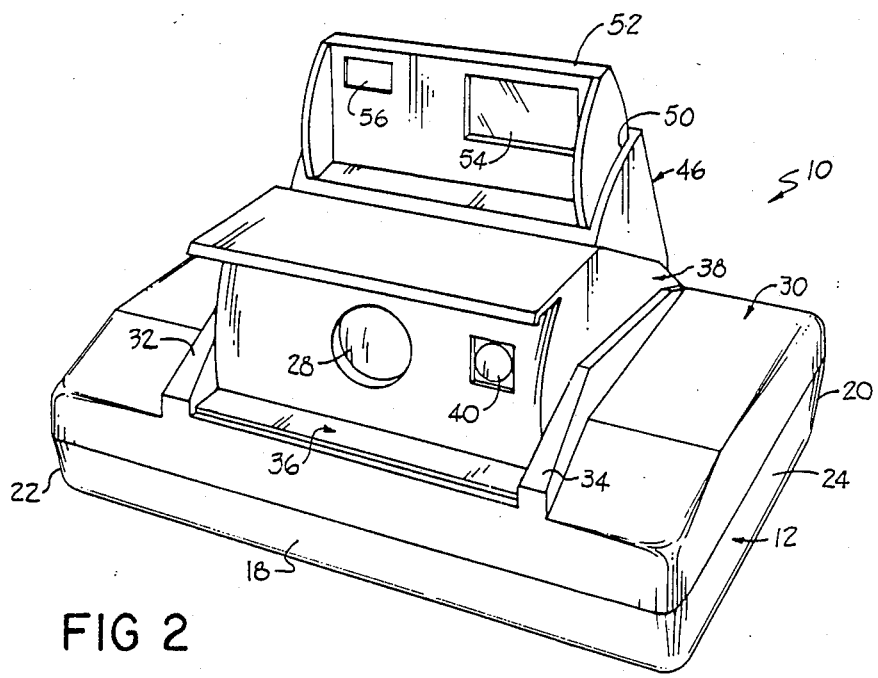
FIG. 2 is a perspective view of the camera of FIG. 1 shown in its erected operative position.

Reference in now made to the drawings, and in particular to FIGS. 1 and 2 wherein is shown a folding camera 10 of the instant or self-developing type. Note should be taken at this time that although the invention is described in relation to a folding camera, the invention is equally applicable to a non-folding camera The camera 10 includes a first or main housing 12 having a loading door 14 in a bottom wall thereof. The first housing 12 also includes front and rear walls 18 and 20, respectively, and end walls 22 and 24. The door 14 is pivotally connected to the end wall 22 of the main housing 12 by a hinge (not shown) which is generally parallel with the axis of the camera's objective lens 28 and perpendicular to the forward and rear walls 18 and 20. The main housing 12 further includes a top wall 30 having a pair of spaced flanges 32 and 34 extending upwardly therefrom so as to define a recess 36.

The camera 10 further includes a second housing 38 which is pivotally coupled to the first housing 12 about an axis (not shown) which is generally parallel with the rear wall 20 for movement between an inoperative position (see FIG. 1), wherein it is nested within the recess 36, and its operative position, as shown in FIG. 2. The second housing 38 supports the aforementioned objective lens 28, a shutter assembly, and a photocell window 40. A top wall 42 of the second housing includes a recess which is adapted to receive a third housing 46 of the camera 10 when the camera is being collapsed or folded.

The third housing 46 is pivotally coupled to the rear wall 20 of the first housing 12 about a horizontal axis (not shown) which is generally parallel with the rear wall 20. The third housing 46 is provided with a recess 50 for pivotally receiving therein a fourth housing 52.

The fourth housing 52 supports a source of artificial illumination such as a strobe 54 and a ranging window 56. The fourth housing 52, as well as the second and third housings 38 and 46, is biased into the erect position shown in FIG. 2. Further, the fourth section 52 is adapted to be nested within the recess 50 prior to the third housing 46 being moved into the recess 44.

When the various housings are in the positions shown in FIG. 2, actuation of an exposure cycle initiation button 58 (see FIG. 1) located within a recess in the top wall 30 of the first housing 12 is effective to cause image bearing light rays to enter the camera 10 via the lens 28 and be reflected downwardly by a mirror (not shown) onto a film unit.

The camera 10 includes a film chamber 60 which is accessible via the loading door 14. The film chamber 60 is adapted to receive a film assemblage 70. The film chamber 60 is defined in part by a wall 62 which functions to locate a film cassette 72 of the assemblage 70 in position for the sequential exposure of a plurality of film units 74 stacked therein.

Figure 5:
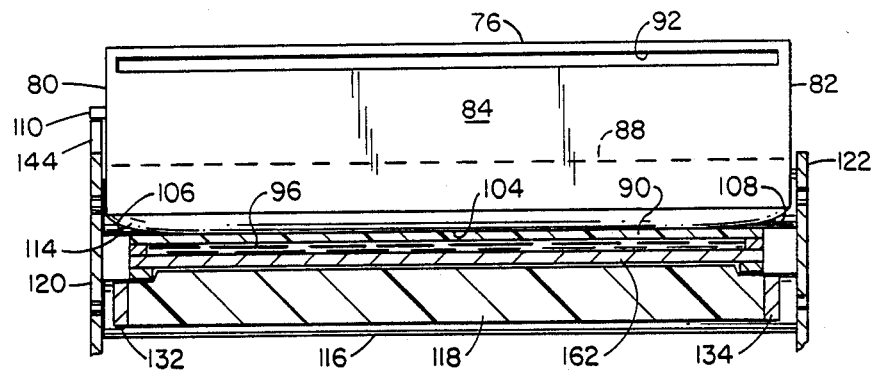
FIG. 5 is an enlarged end view showing the relationship between a film cassette, an exposed film unit, and the second pressure-applying means during the spreading of a processing liquid between layers of the film unit, the film unit elements being greatly enlarged for clarity of understanding.
Figure 6:
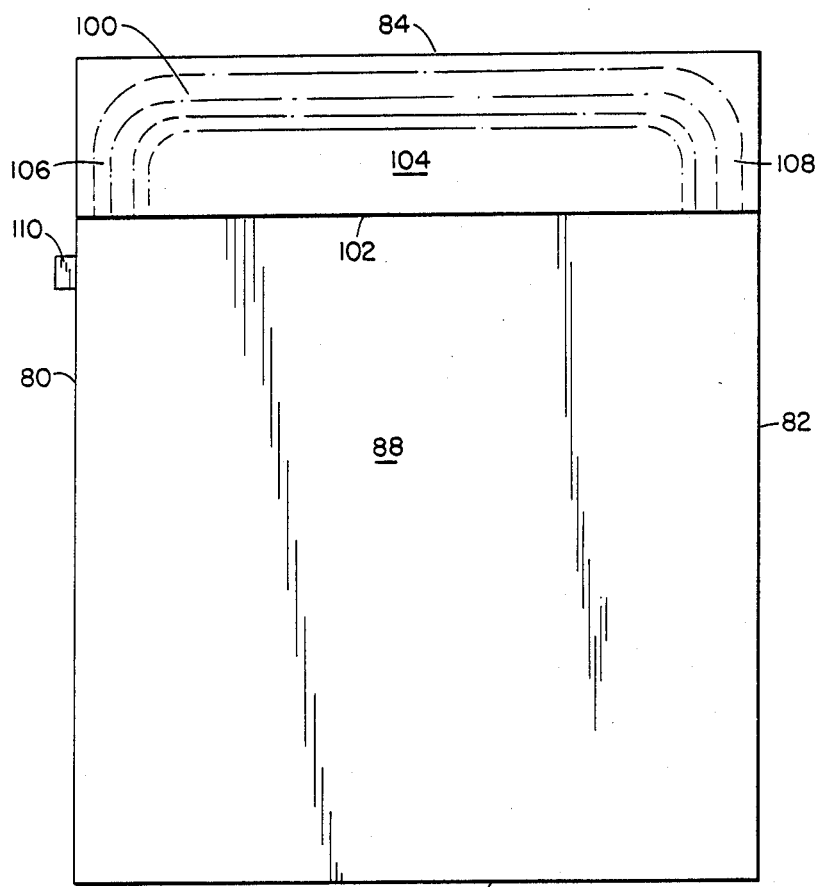
FIG. 6 is a bottom view of the film cassette shown in FIGS. 3-5.

The film assemblage 70 includes, in addition to the film cassette 72 and the film units 74, biasing means (not shown) for resiliently urging the stack of film units 74 toward a forward wall 76 of the film cassette 72. The forward wall 76 is provided with a generally rectangular shaped exposure aperture 78 which is adapted to be located in alignment with a correspondingly shaped aperture 64 located in the wall 62. The forward wall 76 cooperates with a pair of side walls 80 and 82, leading and trailing end walls 84 and 86, and a bottom wall 88, to define a chamber for receiving the stack of film units 74. The aforementioned biasing means is located between the bottom wall 88 and an adjacent endmost film unit 74 so as to urge the opposite endmost film unit 74 in the stack against the interior surface of the forward wall 76 with (1) its photosensitive layer 90 (see FIG. 5) located in alignment with the exposure aperture 78, (2) its leading end located in position to be moved through an elongate egress 92 in the cassette's leading end wall 84, and (3) its trailing end located adjacent the trailing end wall 86. The leading end of each film unit 74 is provided with a pod or container 94 of processing liquid 96 (see FIG. 5) and the trailing end of each film unit is formed with a trap 98 for receiving any excess processing liquid 96.

Extending downwardly from the bottom wall 88 and integrally formed therewith is a protuberance 100 which functions to control the distribution of the processing liquid to be spread between layers of an exposed film unit. The protuberance 100 slopes downwardly and rearwardly as it extends from the leading end wall 84 to its left terminus 102 (as viewed in FIG. 3) to define a surface 104 having upwardly sloping lateral ends 106 and 108 (see FIG. 5).

The side wall 84 of the film cassette 72 has a tab 110 which extends outwardly therefrom. As will be more fully described hereinafter, the tab 110 is adapted to cooperate with camera structure to adjust the location of a pressure-generating gap relative to a path of travel of an exposed film unit as the latter enters the gap so as to increase or decrease the thickness of a layer of processing liquid to be spread between layers or elements of the film unit.

Figure 3:
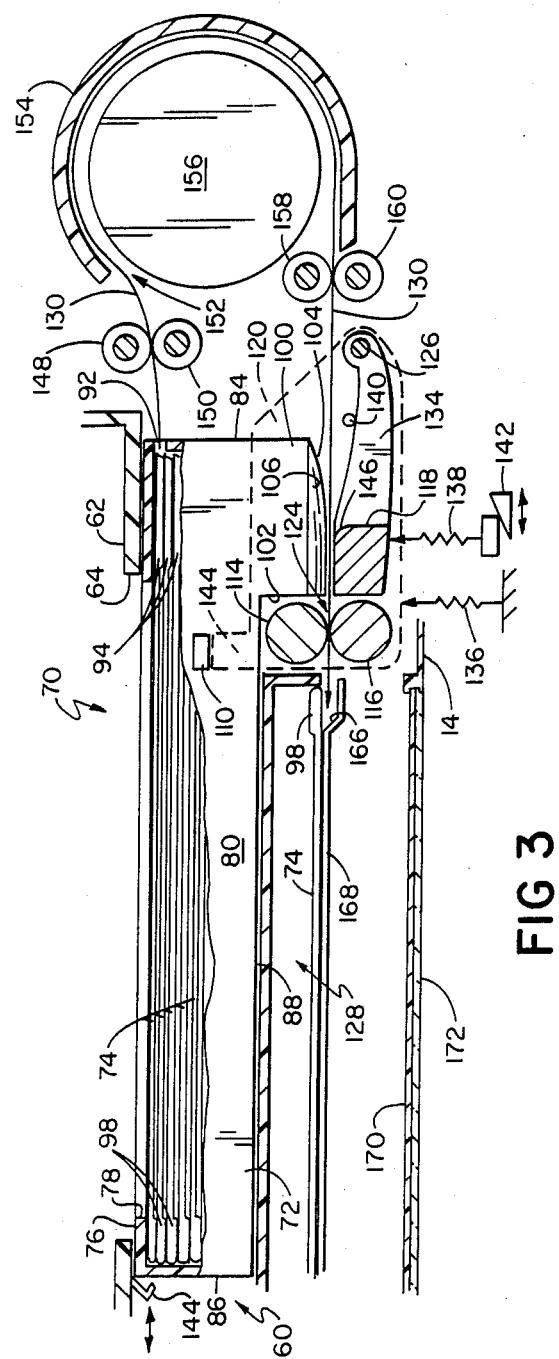
FIG. 3 is an enlarged partial view of the camera taken generally along the line 3—3 in FIG. 1 with parts omitted for reasons of clarity.
Figure 4:
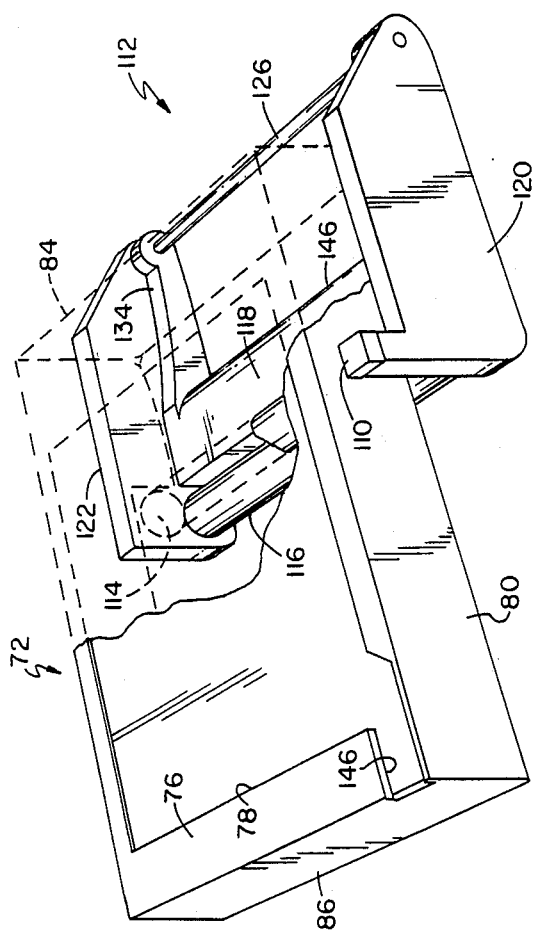
FIG. 4 is an enlarged perspective view showing the relationship between a photographic film assemblage, which forms a part of the invention, and a pivotally mounted supporting structure for the camera's first and second pressure-applying means.

The camera 10 includes a structure 112 for supporting (1) a first pressure-applying means in the form of elongate spread rollers 114 and 116, and (2) a second pressure-applying means in the form of a laterally extending plate 118. The opposite ends of the spread rollers 114 and 116 are rotatably supported in one end of a pair of laterally spaced arms 120 and 122 so as to define a pressure generating gap 124 therebetween. The roller 116 is mounted for movement toward and away from the roller 114. The opposite ends of the arms 120 and 122 are rotatably supported on a cylindrical rod 126. In FIG. 3, the arm 120 is shown in phantom lines so as to provide a better view of the camera's first and second pressure-applying means and the surfaces 104 and 106 of the protuberance 100. Also in FIG. 3, the pressure generating gap 124 is shown as being located in alignment with a path of travel that an exposed film unit 74 would take as it moves from the film cassette 72 to a film storage 128, said path of travel being indicated by the line 130. The plate 118 extends between the ends of another pair of arms 132 and 134, the opposite ends of which are also rotatably supported by the rod 126. Thus, as best seen in FIG. 4, the second pressure-applying means is adapted to be independently rotated about the rod 126 without affecting the movement of the first pressure-applying means. Suitable means, such as a spring schematically shown in FIG. 3 at 136, is provided for resiliently biasing the arm(s) 134 and 136 is a clockwise direction against a stop (not shown). A separate spring 138 is provided for resiliently biasing the arm(s) 132 and 134 in a clockwise direction into engagement with a stop 140. The force of the spring 138 may be increased or decreased by moving an adjusting cam 142 to the left or right, respectively, as shown in FIG. 3.

When a film cassette 72 is positioned within the film chamber 60, the tab 110 engages an upwardly extending portion 144 of the arm 120 and causes the first pressure-applying means (arms 118, 120 and rollers 116 and 112) to be rotated in a counterclockwise direction about the rod 126 until the film cassette 72 is in the position shown in FIG. 3 and the gap 124 properly located relative to the path of travel 130; the degree of such rotation being a function of the thickness of the tab 110 or its location on the side wall of the film cassette 72, which in turn is a function of a predetermined desired thickness for a layer of processing liquid 96 to be spread between layers of the particular film units located in the film cassette 72.

At the same time that the above spacial relationship between the gap 124 and the path of travel 130 is being established a second relationship is being established, namely, the juxtapositioning of the protuberance 100 on the bottom wall 88 of the film cassette 72 and the second pressure-applying means (the plate 118). Preferably, this latter relationship is established by the protuberance 100 lightly engaging the top surface of the plate 118 such that the sloping surface 104 of the protuberance cooperates with a curved surface 146 of the plate 118 to define a converging passage to facilitate the introduction of a film unit between the protuberance 100 and the plate 118. Alternatively, the stop 140 may also function to provide for some initial gap between the two members.

Once the film cassette 72 has been properly located in the position shown in FIG. 3, and the film assemblage's dark slide (not shown) removed thereby uncovering the upper endmost film unit 74 in the stack, actuation of the button 58 is effective to initiate an exposure cycle. Subsequent to the photographic exposure of the endmost film unit 74, a battery energized motor (not shown) is used to drive a film advancing member 144 (first advancing means) in a reciprocating manner such that it enters an ingress 146 (see FIG. 4) formed in the forward and trailing end walls 76 and 86, respectively, of the film cassette 72 and engages the endmost film unit by its trailing edge and moves it in a first direction toward the exterior of the film cassette 72 via the egress 92. As the endmost film unit 74 emerges from the film cassette 72, its leading end enters the bite between laterally spaced pairs of edge rollers 148 and 150, only one pair being shown. The pairs of rollers 148 and 150 are driven in a direction which continues the movement of the exposed endmost film unit 74 along the path 130 in said first direction and then in a second direction, generally opposite to the first direction. A curved passageway 152 defined by a laterally extending curved plate 154 and a cylindrical member 156 facilitates such reversal. As the film unit's leading end emerges from the passageway 152, it enters the bite of another set of laterally spaced pairs of edge rollers 158 and 160 (only one pair shown) which continue the advancement of the endmost film unit 74 in the second direction as its trailing end leaves the bite of the first set of edge rollers 148 and 150. The pairs of rollers 148, 150 and 158, 160 are adapted to engage only the lateral margins 162 and 164 of the endmost film unit 74. Thus, the two sets of edge rollers and the means defining the curved passageway 152 define a second means for continuing the movement of the endmost film unit in the first direction and then in a second direction generally opposite to the first direction.

The second set of pairs of edge rollers 158 and 160 continue to drive the film unit in the second direction between the protuberance 100 and the second pressure applying means (plate 118) and into the bite of the spread rollers 114 and 116, at least one of which is driven in a direction to continue the advancement of the film unit. As is well known in the art, the rollers 114 and 116 function to rupture the container 94 of processing liquid and spread its contents 96 in a layer between elements of the film unit, e.g., the photosensitive sheet 90 and an image-receiving sheet 162, so as to initiate the formation of a visible image within the sheet 162 while simultaneously advancing the film unit into the lighttight storage chamber 128. As the film unit 74 enters the chamber 128, its leading end engages a pair of ramps 166 166 (only one shown) located on the right hand ends of a pair (only one shown) of inwardly extending horizontal surfaces 168. The drive of the spread rollers 114 and 116 propel the film unit 74 up the ramps 166 and onto the surfaces 168 which function to support only the lateral sides 162 and 164 of the film unit. After a predetermined period of time, which period is of a length sufficient for the processing of the film unit 74 to reach a point where its emerging image is no longer susceptible to being adversely affected by ambient light, an opaque shade 170 may be moved from covering relation to a window 172 in the door 14 to allow viewing of the image within the film unit 74. The film unit may then be removed from the film chamber 128 via an exit (not shown) or left in place and the shade 170 returned to its lighttight position relative to the window 172 in preparation for a second exposure. Each subsequent film unit 74 entering the storage chamber 128 will automatically assume the lowermost position because of the placement of the ramps 166, thus assuring that the last film unit to be exposed will be available for viewing while in the storage chamber.

Figure 7:
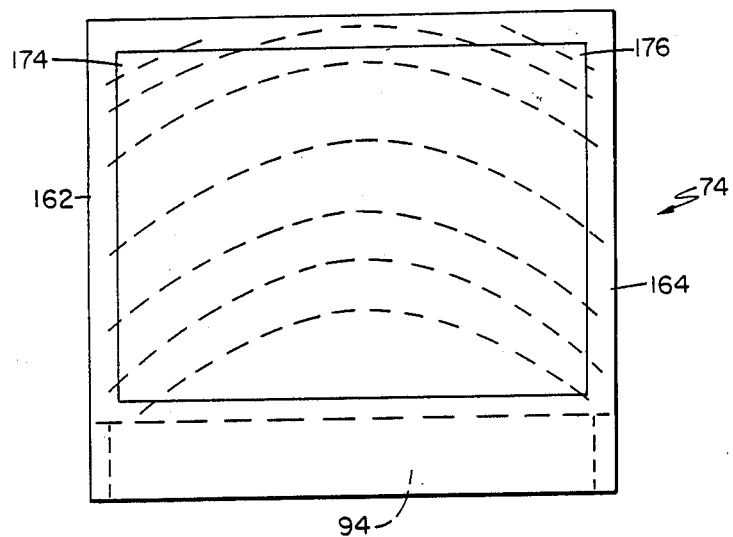
FIG. 7 is a diagrammatic plan view of a film unit showing, in dotted lines, an advancing wave front of processing liquid as it would appear without benefit of the present invention.
Figure 8:
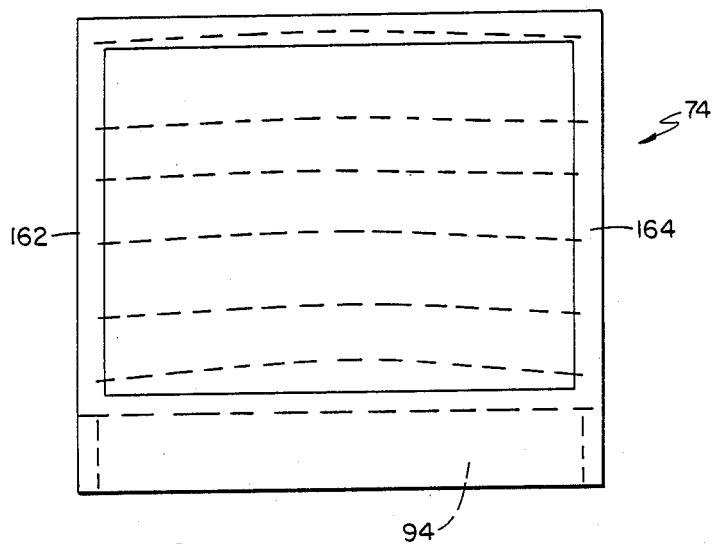
FIG. 8 is a view similar to FIG. 7 showing, in dotted lines, an advancing wave front as it would appear with the present invention.

When the spread rollers 114 and 116 rupture the pod 94 at the leading end of the exposed film unit 74, the processing liquid 96 emerges therefrom as a wave whose front is controlled by the specific shape of the protuberance 100. In the present form of the invention, the intermediate portion 104 of the protuberance 100 retards the adjacent portion of the wave front of the processing liquid 96 while the upwardly tapering or sloping lateral ends 106 and 108 gradually offer less and less resistance to the adjacent portions of the wave front. Thus, the net effect of the protuberance 100 on the wave front is to straighten out its normally tongue shape configuration, as shown in FIG. 7 where opposite end corners 174 and 176 of the film unit may receive too little or none of the processing liquid, to one where the wave front is generally perpendicular to the direction of movement of the film unit 74 thereby providing a more uniform distribution of the processing liquid 96.

Since certain changes may be made in the above described invention without departing from the scope thereof, it is intended that all matter contained in the above description or shown in the accompanying drawings shall be interpreted as illustrative and not in a limiting sense. For example, while the protuberance 100 has been shown as a unitary member having a specific configuration, it could be comprised of a plurality of separate smaller members whose configurations and spacial relation to each other would be a function of the specific control to be applied to the wave front of the processing liquid.

What is claimed is:

1. Photographic apparatus comprising:
   a film cassette having a chamber defined by forward and rear walls interconnected by a pair of side walls, a leading end wall and a trailing end wall, said forward wall including means defining an exposure aperture and said leading end wall including means defining an egress through which a film unit may be advanced from said chamber;
   processing liquid spread control means extending from an exterior surface of said rear wall;
   a plurality of film units located within said chamber in stacked relation with an endmost film unit in said stack being adapted to be urged into a position adjacent said exposure aperture with a leading edge of said endmost film unit being located in position to be moved through said egress, each of said film units including a supply of processing liquid;
   means for locating said film cassette in position for the sequential exposure of said film units;
   first means for advancing said endmost film unit in a first direction, subsequent to its exposure, toward the exterior of said film cassette;
   second means for continuing the movement of said endmost film unit in said first direction and then in a second direction generally opposite to said first direction;
   first pressure-applying means mounted in the path of travel of said endmost film unit as it is being advanced in said second direction, said pressure-applying means being adapted to spread said processing liquid across a layer said endmost film unit to initiate the formation of a visible image within said endmost film unit, said first pressure-applying means being mounted closely adjacent said processing liquid spread control means; and
   second pressure-applying means mounted in position to engage a major surface of said endmost film unit during the spreading of said processing liquid and urge its opposite into engagement with said processing liquid spread control means so as to control the distribution of the processing liquid being spread by said first pressure-applying means.

2. Photographic apparatus as defined in claim 1 wherein said first pressure-applying means comprises a pair of rollers which define a pressure generating gap through which said endmost film unit is adapted to be moved, said photographic apparatus further includes means for mounting said rollers for simultaneous movement toward and away from said rear wall of said film cassette.

3. Photographic apparatus as defined in claim 2 wherein said film cassette further includes means on an external surface thereof engageable by said mounting means for locating said pressure generating gap of said rollers relative to said path of travel of said endmost film unit in said second direction.

4. Photographic apparatus as defined in claim 3 wherein said mounting means includes means for supporting said second pressure-applying means for movement toward and away from said processing liquid spread control means.

5. Photographic apparatus as defined in claim 4 wherein said supporting means is adapted to support said second pressure-applying means for movement independent of movement of said first pressure-applying means.

6. Photographic apparatus as defined in claim 1 further including means for biasing said second pressure-applying means toward said processing liquid spread control means.

7. Photographic apparatus as defined in claim 6 further including means for regulating the force of said biasing means.

8. Photographic apparatus as defined in claim 7 wherein said regulating means includes said processing liquid spread control means.

9. A photographic film assemblage for use with a camera of the self-developing type having a first pressure-applying means having a pressure-generating gap for spreading a processing liquid across a layer of an exposed film unit to initiate the formation of a visible image therein, said photographic film assemblage comprising:
   a film cassette having a chamber defined by forward and rear walls, a pair of laterally spaced side walls, and leading and trailing end walls, said forward wall including means defining an exposure aperture therein and said leading end wall includes means defining an egress through which a film unit may be moved from said chamber;
   a plurality of film units located within said chamber in stacked relation with an endmost film unit in said stack being adapted to be urged into a position adjacent said exposure aperture with a leading edge of said endmost film unit being located in position to be moved through said egress, each of said film units including a supply of processing liquid, each of said film units being adapted to be moved from said film cassette via said egress and along a path of travel in the camera, subsequent to its exposure, which movement includes passage through the pressure-generating gap; and means extending from an external surface of said film cassette, said extending means being engageable with the camera's first pressure-applying means for moving the first pressure-applying including its pressure-generating gap in a direction generally perpendicular to the path of travel of said endmost film unit thus relocating its pressure-generating gap relative to the path of travel of said endmost film unit.

10. A photographic film assemblage as defined in claim 9 wherein said extending means protrudes from one of said side walls.

11. A photographic film assemblage for use with a camera of the self-developing type having a first pressure-applying means having a pressure generating gap for spreading a processing liquid across a layer of an exposed film unit to initiate the formation of a visible image therein, and a second pressure-applying means for simultaneously urging the exposed film unit into engagement with an external surface of a film cassette comprising an element of said photographic film assemblage comprising:

a film cassette having a chamber defined by forward and rear walls, a pair of laterally spaced side walls, and leading and trailing end walls, said forward wall including means defining an exposure aperture therein and said leading end wall includes means defining an egress through which a film unit may be moved from said chamber;

a plurality of film units located within said chamber in stacked relation with an endmost film unit in said stack being adapted to be urged into a position adjacent said exposure aperture with a leading edge of said endmost film unit being located in position to be moved through said egress, each of said film units including a supply of processing liquid, each of said film units being adapted to be moved from said film cassette via said egress and along a path of travel in the camera, subsequent to its exposure, which movement includes passage through the pressure generating gap; and processing liquid spread control means extending from an external surface of said film cassette, said processing liquid spread control means being adapted to cooperate with the camera's second pressure-applying means for controlling the spreading of said processing liquid by the first pressure-applying means.

12. A photographic film assemblage as defined in claim 11 wherein said processing liquid spread control means extends from said bottom wall of said film cassette.

13. A photographic film assemblage as defined in claim 12 wherein said processing liquid spread control means is integrally formed in an external surface of said bottom wall.

14. A photographic film assemblage as defined in claim 11 wherein said film cassette further includes means extending from an external surface thereof and adapted to engage the camera's first pressure-applying means for adjusting the position of its pressure generating gap relative to the path of travel of a film unit subsequent to its photographic exposure.

15. A photographic film assemblage as defined in claim 14 wherein said extending means is integrally formed in one of said side walls.

16. Photographic apparatus comprising:

a film cassette having a chamber defined by forward and rear walls interconnected by a pair of side walls, a leading end wall and a trailing end wall, said forward wall including means defining an exposure aperture and said leading end wall including means defining an egress through which a film unit may be advanced from said chamber;

processing liquid spread control means extending from an exterior surface of said rear wall;

a plurality of film units located within said chamber in stacked relation with an endmost film unit in said stack being adapted to be urged into a position adjacent said exposure aperture with a leading edge of said endmost film unit being located in position to be moved through said egress, each of said film units including a supply of processing liquid;

means for locating said film cassette in position for the sequential exposure of said film units;

first means for advancing said endmost film unit in a first direction, subsequent to its exposure, toward the exterior of said film cassette;

second means for continuing the movement of said endmost film unit in said first direction and then in a second direction generally opposite to said first direction, said second means including means for guiding said endmost film unit through an arcuate path;

first pressure-applying means mounted in the path of travel of said endmost film unit as it is emerging from said guiding means, said pressure-applying means being adapted to spread said processing liquid across a layer of said endmost film unit to initiate the formation of a visible image within said endmost film unit, said first pressure-applying means being mounted closely adjacent said processing liquid spread control means; and second pressure-applying means mounted between said first pressure-applying means and said guiding means and adapted to engage a major surface of said endmost film unit during the spreading of said processing liquid and urge its opposite surface into engagement with said processing liquid spread control means so as to control the distribution of the processing liquid being spread by said first pressure-applying means.

17. Photographic apparatus as defined in claim 16 wherein said first pressure-applying means comprises a pair of rollers which define a pressure generating gap through which said endmost film unit is adapted to be moved, said photographic apparatus further includes means for mounting said rollers for simultaneous movement toward and away from said rear wall of said film cassette.

18. Photographic apparatus as defined in claim 17 wherein said film cassette further includes means on an external surface thereof engageable by said mounting means for locating said pressure generating gap of said rollers relative to said path of travel of said endmost film unit in said second direction.

19. Photographic apparatus as defined in claim 18 wherein said mounting means includes means for supporting said second pressure-applying means for movement toward and away from said processing liquid spread control means.

20. Photographic apparatus as defined in claim 19 wherein said supporting means is adapted to support said second pressure-applying means for movement independent of movement of said first pressure-applying means.

21. Photographic apparatus as defined in claim 16 further including means for biasing said second pressure-applying means toward said processing liquid spread control means.

22. Photographic apparatus as defined in claim 21 further including means for regulating the force of said biasing means.

23. Photographic apparatus as defined in claim 22 wherein said regulating means includes said processing liquid spread control means.

24. Photographic apparatus as defined in claim 16 further including a storage chamber for receiving said endmost film unit as it emerges from said first pressure-applying means.

* * * * *